United States Patent
Chou et al.

(10) Patent No.: US 12,177,595 B2
(45) Date of Patent: Dec. 24, 2024

(54) VIDEO DEVICE, WIRELESS AUDIO DEVICE AND METHOD FOR PERFORMING AUDIO AND VIDEO SYNCHRONIZATION BETWEEN VIDEO DEVICE AND WIRELESS AUDIO DEVICE

(71) Applicant: MEDIATEK INC., Hsin-Chu (TW)

(72) Inventors: Chun-Ming Chou, Hsinchu (TW); Shaoyong Duan, Wuhan (CN); Kuo-Ho Tsai, Hsinchu (TW); Chung-Yu Lin, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 18/226,794

(22) Filed: Jul. 27, 2023

(65) Prior Publication Data
US 2024/0040065 A1    Feb. 1, 2024

(30) Foreign Application Priority Data

Jul. 28, 2022    (CN) .......................... 202210899993.5

(51) Int. Cl.
*H04N 5/06*    (2006.01)
*H04N 5/05*    (2006.01)

(52) U.S. Cl.
CPC ................. *H04N 5/06* (2013.01); *H04N 5/05* (2013.01)

(58) Field of Classification Search
CPC ...... H04N 5/06; H04N 5/05; H04N 21/43076; H04N 21/43615; H04N 21/4392; H04N 21/43637; H04N 21/4307; H04R 2420/07
See application file for complete search history.

(56) References Cited

U.S. PATENT DOCUMENTS

| | | | |
|---|---|---|---|
| 2008/0168312 A1* | 7/2008 | Banks | H04L 1/0041 714/39 |
| 2014/0376873 A1* | 12/2014 | Tanaka | H04N 21/42204 386/203 |
| 2015/0215496 A1* | 7/2015 | Matsuo | H04N 5/04 348/515 |
| 2015/0334338 A1* | 11/2015 | Lim | H04N 21/43637 348/515 |

(Continued)

FOREIGN PATENT DOCUMENTS

| | | |
|---|---|---|
| TW | 200829009 | 7/2008 |
| TW | 201225645 A1 | 6/2012 |

*Primary Examiner* — Michael Lee
(74) *Attorney, Agent, or Firm* — Winston Hsu (57) ABSTRACT

A video device, a wireless audio device and a method for performing audio and video (AV) synchronization between the video device and the wireless audio device are provided. The method includes: utilizing a controller of the video device to determine a video delay of the video device; utilizing the controller to determine an audio delay of the video device; utilizing the controller to receive information of a communications quality of the wireless audio device from the wireless audio device, to determine a wireless communications delay between the video device and the wireless audio device according to the communications quality; utilizing the controller to generate a time map information according to the video delay, the audio delay and the wireless communications delay; and transmitting the time map information from the video device to the wireless audio device for AV synchronization between the video device and the wireless audio device.

20 Claims, 5 Drawing Sheets

(56) References Cited

U.S. PATENT DOCUMENTS

| | | | |
|---|---|---|---|
| 2016/0173931 A1* | 6/2016 | Eber | H04N 21/43074 |
| | | | 725/38 |
| 2019/0090028 A1* | 3/2019 | Kirley | H04N 21/41265 |
| 2021/0400168 A1* | 12/2021 | Candelore | H04N 5/04 |
| 2022/0038769 A1* | 2/2022 | Meiyappan | H04N 21/439 |
| 2022/0321941 A1* | 10/2022 | You | H04N 21/43637 |
| 2023/0016118 A1* | 1/2023 | Del Sordo | H04N 21/4305 |
| 2023/0141658 A1* | 5/2023 | Tallapaneni | H04W 4/80 |
| | | | 370/252 |

\* cited by examiner

VIDEO DEVICE, WIRELESS AUDIO DEVICE AND METHOD FOR PERFORMING AUDIO AND VIDEO SYNCHRONIZATION BETWEEN VIDEO DEVICE AND WIRELESS AUDIO DEVICE

BACKGROUND

The present invention is related to audio and video (AV) synchronization, and more particularly, to a video device, a wireless audio device and a method for performing AV synchronization between the video device and the wireless audio device.

Current televisions (TVs) typically include built-in speakers for playing audio signals, and related AV synchronization of a TV can be performed locally. For a condition of a TV connecting with external speakers or amplifiers such as a sound bar, audio data will be transmitted to the external speakers or the sound bar for a purpose of better user experience such as a better audio quality, as the external speakers or the sound bar do not have a feedback mechanism to report communication latency to the TV, the AV synchronization becomes challenging. Thus, a predetermined delay is applied to video signals to preconfigure the timing of displaying video contents, and audio contents is required to be transferred and processed as soon as possible in order to meet the criteria for synchronization. When the audio contents and the video contents are not synchronized, a user needs to manually to apply latency to either the audio contents or the video content. In addition, for some conditions where it is required to make the video content be displayed as much real time as possible (e.g., a game mode of the TV), the AV synchronization becomes more challenging. More particularly, when the TV transmits the audio contents via wireless communications, the problem related to AV synchronization may get worse.

Thus, there is a need for a novel method and associated apparatus, which can properly perform AV synchronization between a video device (e.g., TVs and smart phones) and an external speaker without introducing any side effect or in a way that is less likely to introduce side effects.

SUMMARY

An objective of the present invention is to provide a video device, a wireless audio device and a method for performing audio and video (AV) synchronization between the video device and the wireless audio device, in order to solve the problem of the related art.

At least one embodiment of the present invention provides a method for performing AV synchronization between a video device and a wireless audio device. The method comprises: utilizing a controller of the video device to determine a video delay of a video processing path of the video device; utilizing the controller to determine an audio delay of an audio processing path of the video device; utilizing the controller to receive information of a communications quality of the wireless audio device from the wireless audio device, to determine a wireless communications delay between the video device and the wireless audio device according to the communications quality; utilizing the controller to generate a time map information according to the video delay, the audio delay and the wireless communications delay; and transmitting the time map information from the video device to the wireless audio device for AV synchronization between the video device and the wireless audio device.

At least one embodiment of the present invention provides a video device for performing AV synchronization with a wireless audio device. The vide device comprises a video processing path, an audio processing path and a controller, where the controller is coupled to the video processing path and the audio processing path. The video processing path is configured to process video data for display. The audio processing path is configured to process audio data for playback. The controller is configured to receive information of a communications quality of the wireless audio device from the wireless audio device, in order to determine a wireless communications delay between the video device and the wireless audio device according to the communications quality. In addition, the controller generates time map information according to a video delay of the video processing path, an audio delay of the audio processing path and the wireless communications delay, to allow the video device to transmit the time map information to the wireless audio device for AV synchronization between the video device and the wireless audio device.

At least one embodiment of the present invention provides a wireless audio device for performing AV synchronization with a video device. The wireless audio device comprises a wireless communications circuit, a controller and an audio output device, where the controller is coupled to the wireless communications circuit, and the audio output device is coupled to the controller. The wireless communications circuit is configured to receive packets from the video device. The controller is configured to generate information of a communications quality of the wireless audio device, wherein the information of the communications quality is reported to the video device, to allow the video device to determine a wireless communications delay between the video device and the wireless audio device according to the communications quality. The audio output device is configured to play audio data received from the video device. In addition, the video device transmits a time map information generated according to the wireless communications delay in conjunction with the audio data to the wireless audio device, to allow the audio data played by the audio output device to be synchronized with audio data played on the video device or the video data displayed on the video device with aid of the time map information.

The embodiments of the present invention can perform synchronization according to local delays and the wireless communications delay. More particularly, the time map information generated according to the local delays and the wireless communications delay can be transmitted to external audio device(s) for AV synchronization. In addition, the embodiments of the present invention will not greatly increase overall costs. Thus, the present invention can solve the problem of the related art without introducing any side effect or in a way that is less likely to introduce side effects.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
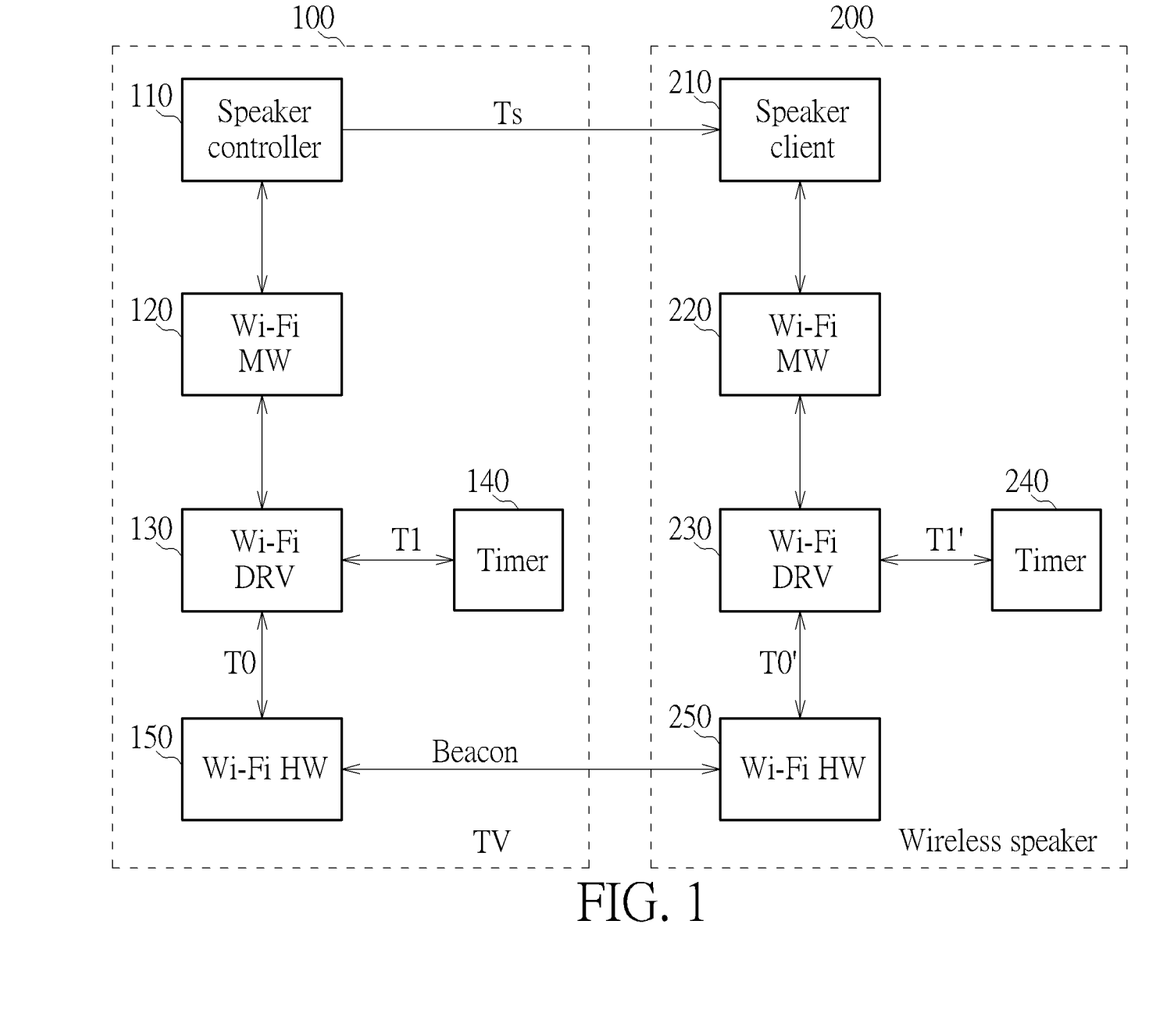
FIG. 1 is a diagram illustrating a video device performing time synchronization with a wireless audio device according to an embodiment of the present invention.

FIG. 1 is a diagram illustrating a video device such as a television (TV) 100 performing time synchronization with a wireless audio device such as a wireless speaker 200 according to an embodiment of the present invention. As shown in FIG. 1, the TV 100 may comprise a controller of a built-in speaker such as a speaker controller 110, a Wi-Fi middleware 120 (labeled "Wi-Fi MW" in FIG. 1 for brevity), a Wi-Fi driver 130 (labeled "Wi-Fi DRV" in FIG. 1 for brevity), a timer 140 and a Wi-Fi hardware 150 (labeled "Wi-Fi HW" in FIG. 1 for brevity). In addition, the wireless speaker may comprise a client-side controller such as a speaker client 210, a Wi-Fi middleware 220 (labeled "Wi-Fi MW" in FIG. 1 for brevity), a Wi-Fi driver 230 (labeled "Wi-Fi DRV" in FIG. 1 for brevity), a timer 240 and a Wi-Fi hardware 250 (labeled "Wi-Fi HW" in FIG. 1 for brevity). In detail, the speaker controller 110 may send a request to the Wi-Fi middleware 120, and the Wi-Fi middleware 120 may access data or information from the timer 140 or the Wi-Fi hardware 150 via the Wi-Fi driver 130, in order to transmit this data or information to the speaker controller 110 in response to this request. Similarly, the speaker client 210 may send a request to the Wi-Fi middleware 220, and the Wi-Fi middleware 220 may access data or information from the timer 240 or the Wi-Fi hardware 250 via the Wi-Fi driver 130, in order to transmit this data or information to the speaker client 210 in response to the request.

In this embodiment, the Wi-Fi hardware 150 and the Wi-Fi hardware 250 may be configured to receive beacon signals (labeled "Beacon" in FIG. 1 for brevity) from each other when performing time synchronization between the TV 100 and the wireless speaker 200. Any (e.g., each) of the beacon signals may carry a counter value for synchronizing timing synchronization functions (TSFs) of the Wi-Fi hardware 150 and the Wi-Fi hardware 250. The timer 140 may act as a system clock of the TV 100, and the timer 240 may act as a system clock of the wireless speaker 200.

Figure 2:
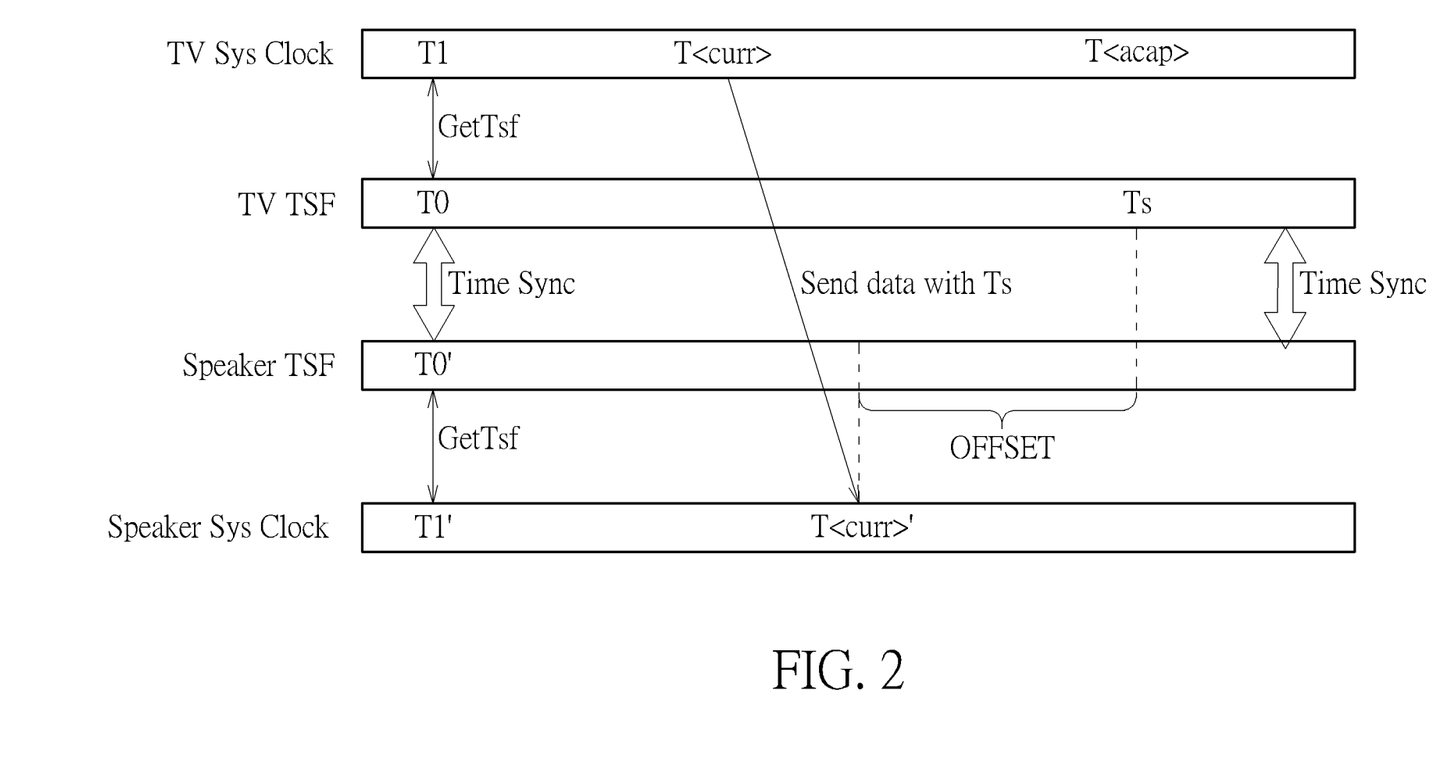
FIG. 2 is a diagram illustrating timing synchronization functions and system clocks of the video device and the wireless audio device shown in FIG. 1 according to an embodiment of the present invention.

For better comprehension, please refer to FIG. 2 in conjunction with FIG. 2. FIG. 2 is a diagram illustrating the TSFs and the system clocks such as the timers 140 and 240 of the TV 100 and the wireless speaker 200 shown in FIG. 1 according to an embodiment of the present invention. A time bar labeled "TV Sys Clock" in FIG. 2 may represent a time domain of the timer 140, a time bar labeled "TV TSF" in FIG. 2 may represent a time domain of the Wi-Fi hardware 150, a time bar labeled "Speaker TSF" in FIG. 2 may represent a time domain of the Wi-Fi hardware 250, and a time bar labeled "Speaker Sys Clock" in FIG. 2 may represent a time domain of the timer 240.

In this embodiment, when the TV 100 performs time synchronization with the wireless speaker 200 (labeled "Time Sync" in FIG. 2 for brevity), a TSF T0 of the TV 100 may be equivalent with a TSF T0' of the wireless speaker 200, and the speaker controller 110 may request for the TSF T0. At a moment of the TSF T0 being synchronized with the TSF T0', time information indicated by the timer 140, which may be referred to as a system clock T1, is recorded and transferred to the speaker controller 110. Thus, the speaker controller 110 may obtain the TSF T0 and the system clock T1, where the speaker controller 110 may map the system clock T1 to the TSF T0 (labeled "GetTsf" in FIG. 2 for better comprehension). Similarly, the speaker client 210 may obtain the TSF T0' and time information indicated by the timer 140 such as a system clock T1', where the speaker client 210 may map the system clock T1' to the TSF T0' (labeled "GetTsf" in FIG. 2 for better comprehension). When the speaker controller 100 transmit audio data to the wireless speaker 200 at a time point T<curr> of the time domain of the timer 140, time map information Ts may be transmitted in conjunction with the audio data to the wireless speaker. Assume that the audio data is to be played at a time point T<acap> of the time domain of the timer 140, the time map information Ts=T<acap>−T1+T0. In order to make the audio data be played on the TV 100 and the wireless speaker 200 at the same time, a time offset value OFFSET may be applied to the audio data on the wireless speaker 200. Assume that the speaker client 200 receives the audio data from the speaker controller 100 at a time point T<curr>' of the time domain of the timer 240, the time offset value OFFSET=Ts−(T<curr>'−T1'+T0').

It should be noted that as a frequency of a reference clock such as a crystal oscillator in the TV 100 is not completely identical to that on the wireless speaker 200, repeatedly performing the time synchronization between the TV 100 and the wireless speaker 200 may be required, for example, the time synchronization may be performed once every second, but the present invention is not limited thereto.

Figure 3:
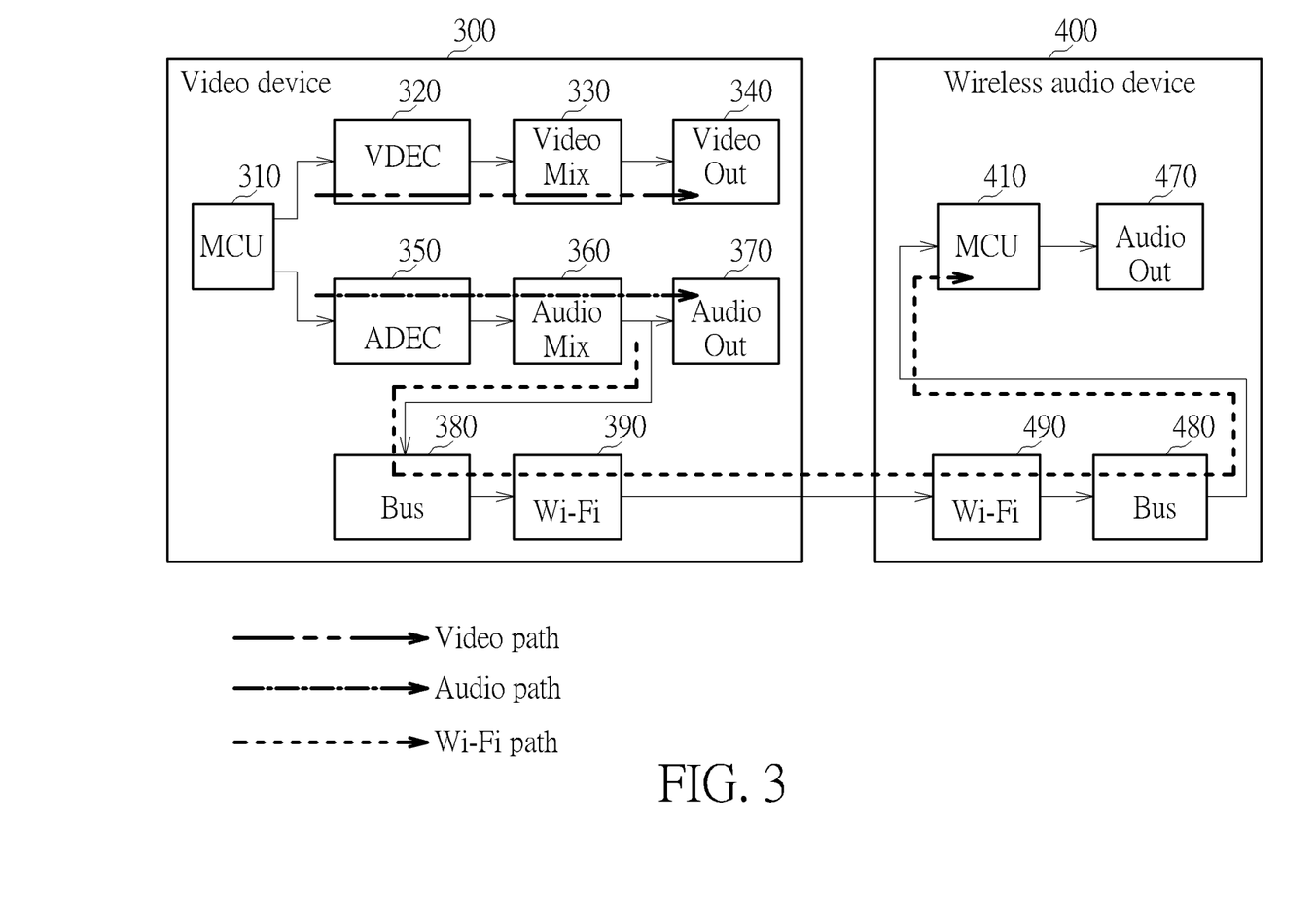
FIG. 3 is a diagram illustrating a video device performing audio and video (AV) synchronization with a wireless audio device according to an embodiment of the present invention.

FIG. 3 is a diagram illustrating a video device 300 performing AV synchronization with a wireless audio device 400 according to an embodiment of the present invention. As shown in FIG. 3, the video device 300 may comprise a video processing path (e.g., a video path illustrated in FIG. 3), an audio processing path (e.g., an audio path illustrated in FIG. 3) and a controller such as a microcontroller unit (MCU) 310, where the MCU 310 is coupled to the video processing path and the audio processing path. In this embodiment, when the MCU 310 obtains AV data, the MCU 310 may transmit a video portion (e.g., video data) of the AV data to the video processing path and transmit an audio portion (e.g., audio data) of the AV data to the audio processing path. The video processing path is configured to process the video data for display, where the video processing path may comprise a video decoder 320 (labeled "VDEC" in FIG. 3 for brevity), at least one video processing circuit such as a video mixing circuit 330 (labeled "Video Mix" in FIG. 3 for brevity) and a video output device 340 (labeled "Video Out"

in FIG. 3 for brevity). The audio processing path is configured to process the audio data for playback, where the audio processing path may comprise an audio decoder 350 (labeled "ADEC" in FIG. 3 for brevity), at least one audio processing circuit such as an audio mixing circuit 360 (labeled "Audio Mix" in FIG. 3 for brevity) and an audio output device 370 (labeled "Audio Out" in FIG. 3 for brevity). As shown in FIG. 3, the video device 300 may further comprise a bus 380 and a wireless communications circuit such as a Wi-Fi circuit 390 (labeled "Wi-Fi" in FIG. 3 for brevity), in order to transmit the audio data via Wi-Fi communications to the wireless audio device 400. In addition, the wireless communications device 400 may comprise a controller such as a MCU 410, an audio output device 470 (labeled "Audio Out" in FIG. 3 for brevity), a BUS 480, and a wireless communications circuit such as a Wi-Fi circuit 490, where the MCU 410 is coupled to the Wi-Fi circuit 490 via the bus 480, in order to perform wireless communications with the video device 300.

In this embodiment, the Wi-Fi circuit 490 may receive packets from the video device 300 (e.g., from the W-Fi circuit 390 therein), and the MCU 410 may generate information of a communications quality of the wireless audio device 400, wherein the information of the communications quality can be reported to the video device 300, to allow the video device 300 to determine a wireless communications delay between the video device 300 and the wireless audio device 400 (e.g., a wireless communications delay of the Wi-Fi path illustrated in FIG. 3) according to the communications quality. For example, different communications qualities of the wireless audio device correspond to different values of the wireless communications delay, respectively. In particular, the MCU 310 may receive the information of the communications quality of the wireless audio device 400 from the wireless audio device 400, in order to determine the wireless communications delay of the Wi-Fi path according to the communications quality. The MCU 310 may generate time map information according to a video delay of the video processing path, an audio delay of the audio processing path and the wireless communications delay, to allow the video device 300 to transmit the time map information to the wireless audio device 400 for AV synchronization between the video device 300 and the wireless audio device 400. When the wireless audio device 400 receive the time map information in conjunction with the audio data, the MCU 410 may control timing of playing the audio data with aid of the time map information, to make the audio data played by the audio output device 470 be synchronized with the audio data played on the video device (e.g., played by the audio output device 370) and/or the video data displayed on the video device (e.g., played by the video output device 340).

In this embodiment, the video delay may comprise a delay introduced by one or more of the video decoder 320, the video mixing circuit 330 and the video output device 340. The audio delay may comprise a delay introduced by one or more of the audio decoder 350, the audio mixing circuit 360 and the audio output device 370.

Figure 4:
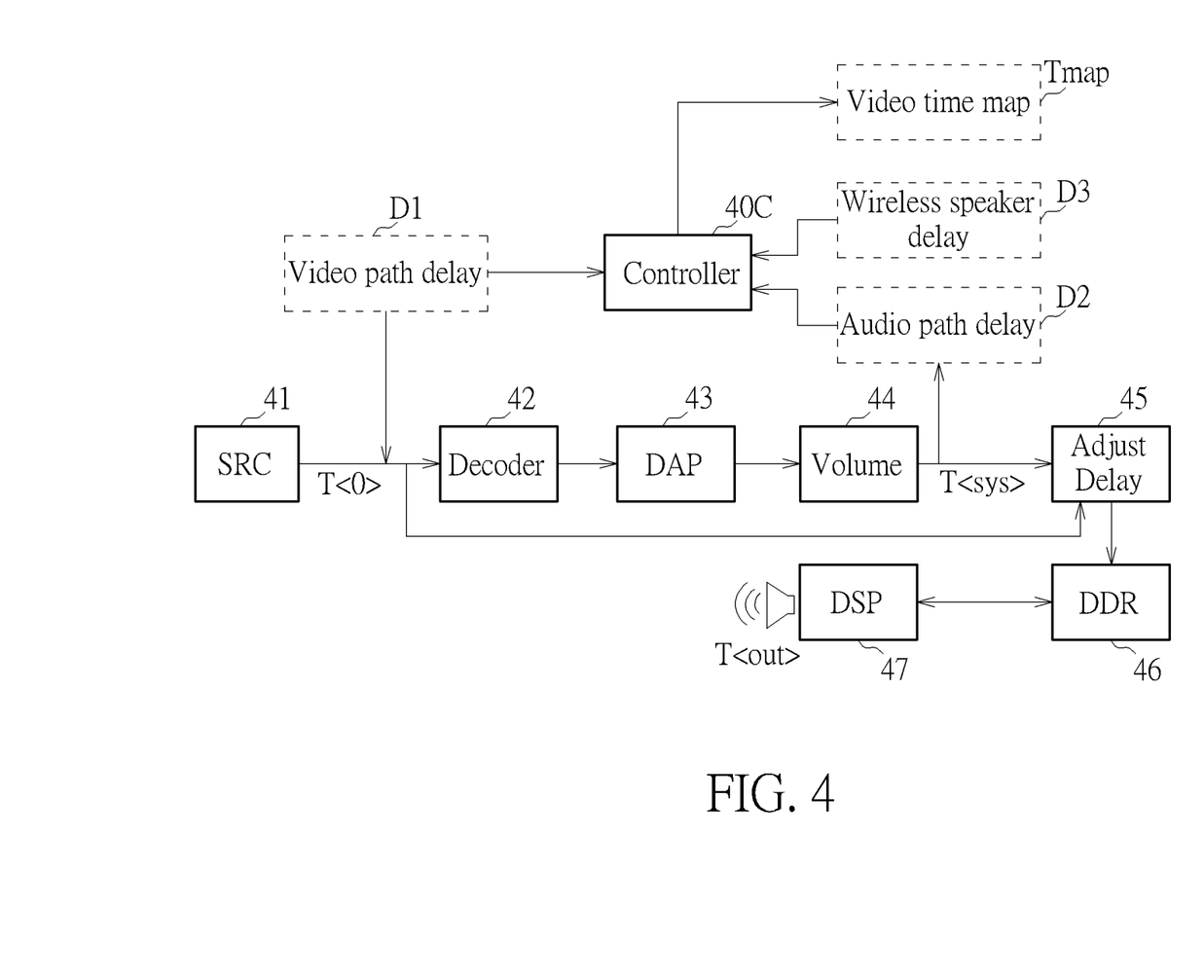
FIG. 4 is a diagram illustrating some details related to AV synchronization according to an embodiment of the present invention.

FIG. 4 is a diagram illustrating some details related to AV synchronization according to an embodiment of the present invention. In this embodiment, a sampling rate converter (SRC) 41 may output the audio data, for example, at a time point T<0>, to an audio processing path which comprises a decoder 42, a Dolby audio processing (DAP) circuit 43 (labeled "DAP" in FIG. 4 for brevity), a volume control circuit 44 (labeled "Volume" in FIG. 4 for brevity), a delay adjusting circuit 45 (labeled "Adjust Delay" in FIG. 4 for brevity), a storage device such as a double data rate (DDR) synchronous dynamic random access memory (SDRAM) 46 (which is referred to as "DDR 46" for brevity) and a digital signal processing (DSP) circuit 47 (labeled "DSP" in FIG. 4 for brevity). The decoder 42 may be a pulse code modulation (PCM) render decoder, which may be an example of the audio decoder 350 shown in FIG. 3, but the present invention is not limited thereto. An entirety of the DAP circuit 43, the volume control circuit 44 and the delay adjusting circuit 45 may be an example of the audio mixing circuit 360, and an entirety of the DDR 46 and the DSP circuit 47 may be an example of the audio output device 370. As shown in FIG. 4, a video path delay D1 may be set at the time point T<0> and reported to a controller 40C (e.g., the speaker controller 110 shown in FIG. 1 and the MCU 310 shown in FIG. 3), and the processing of the decoder 42, the DAP circuit 43 and the volume 44 is completed at a time point T<sys>, where a delay introduced by the decoder 42, the DAP circuit 43 and the volume 44 can be obtained and reported to the controller 40C.

In this embodiment, the delay adjusting circuit 45 is configured to maps a time stamp to the audio data. The DDR 46 is coupled to the delay adjusting circuit 45, and is configured to store the audio data in conjunction with the time stamp. The DSP circuit 47 is coupled to the DDR 46, and is configured to access the audio data from the DDR 46, and process the audio data for being played by a built-in speaker of a video device (e.g., the video device 300 shown in FIG. 3) at a target time point T<out> corresponding to the time stamp. In one embodiment, an audio path delay D2 may be calculated by T<sys>-T<0>. In some embodiment, the audio path delay D2 may further comprise a delay introduced by one or more of the delay adjusting circuit 45, the DDR 46 and the DSP circuit 47. For example, a total delay introduced by the path from the delay adjusting circuit 45 to the DPS circuit 47 may be estimated in advance, and the estimated result can be added to the audio path delay D2 at the time point T<sys>, but the present invention is not limited thereto. In addition, a wireless speaker delay D3 can be determined as illustrated in the previous embodiment, where the wireless speaker delay D3 may be an example of the delay of the Wi-Fi path shown in FIG. 3.

It should be noted that when a TSF of the Wi-Fi circuit 390 of the video device 300 is synchronized with a TSF of the Wi-Fi circuit 490 of the wireless audio device 400 (e.g., making T0=T0' as illustrated in the embodiment of FIG. 1), the MCU 310 (e.g., the controller 40C) may generate the time map information according to the TSF of the Wi-Fi circuit 390 of the video device 300. In particular, the MCU 310 (e.g., the controller 40C) may determine a target time point T<out> (which may be an example of T<acap> mentioned in the embodiment of FIG. 1) according to the video delay, the audio delay and the wireless communications delay. For example, the MCU 310 (e.g., the controller 40C) may determine a maximum delay among the video path delay D1, the audio path delay D2 (e.g., a delay introduced by a path from the decoder 42 to the DSP circuit 47), and the wireless speaker delay D3 plus a local audio delay (e.g., a delay introduced by a path from the decoder 42 to the delay adjusting circuit 45) to be a stream delay, where the MCU 310 (e.g., the controller 40C) may generate the time stamp corresponding to the target time point T<out> according to the stream delay, to make the audio data be played and the video data be displayed at the target time point T<out>. In addition, the MCU 310 (e.g., the controller 40C) may generate the time map information according to the target time point T<out>, the TSF of the Wi-Fi circuit 390 of the video device 300 and a system clock value (e.g., the system clock T1 mentioned in the embodiment of FIG. 1). In detail, the target time point T<out> represents a time point of a system clock domain (e.g., the time domain of the timer 140) of the video device 300 at which the video data to be displayed or the audio data to be played, and the system clock value represents a time point of the system clock domain of the video device 300 at which the TSF of the Wi-Fi circuit 390 of the video device 300 is synchronized with the TSF of the Wi-Fi circuit 490 of the wireless audio device 400. The video device 300 may transmit the audio data in conjunction with the time map information (e.g., the time information Ts mentioned in the embodiment of FIG. 1) to the wireless audio device 400, to allow the audio data played on the wireless audio device 400 to be synchronized with the video data displayed on the video device 300 or the audio data played on the video device 300 with aid of the time map information. Those skilled in this art should understand how the wireless audio device 400 synchronizes the playback of the audio data with the aid of the time map information by referring the embodiments of FIG. 1 and FIG. 2, and related details are omitted here for brevity.

Figure 5:
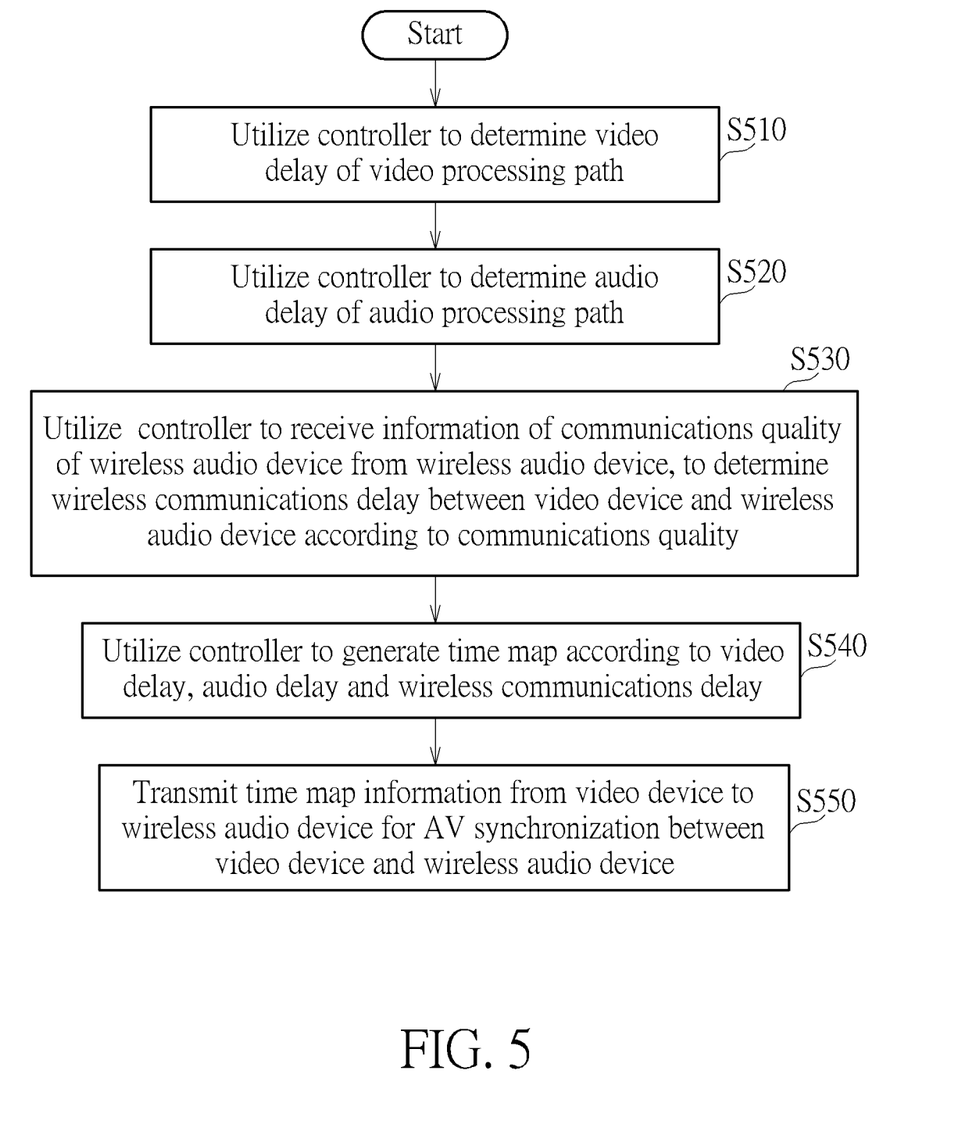
FIG. 5 is a diagram illustrating a working flow of a method for performing AV synchronization between a video device and a wireless audio device according to an embodiment of the present invention.

FIG. 5 is a diagram illustrating a working flow of a method for performing AV synchronization between a video device (e.g., the video device 300 shown in FIG. 3) and a wireless audio device (e.g., the wireless audio device 400 shown in FIG. 3) according to an embodiment of the present invention. It should be noted that the working flow shown in FIG. 5 is for illustrative purposes only, and is not meant to be a limitation of the present invention. One or more steps may be added, deleted or modified in the working flow shown in FIG. 5 if a same result can be obtained. In addition, these steps do not have to be executed in the exact order shown in FIG. 5.

In Step S510, the video device may utilize a controller thereof to determine a video delay of a video processing path of the video device.

In Step S520, the video device may utilize the controller thereof to determine an audio delay of an audio processing path of the video device In Step S530, the video device may utilize the controller thereof to receive information of a communications quality of the wireless audio device from the wireless audio device, to determine a wireless communications delay between the video device and the wireless audio device according to the information of the communications quality.

In Step S540, the video device may utilize the controller thereof to generate a time map information according to the video delay, the audio delay and the wireless communications delay.

In Step S550, the video device may transmit the time map information from the video device to the wireless audio device for AV synchronization between the video device and the wireless audio device.

To summarize, the embodiments of the present invention can perform synchronization with external audio device(s) according to local delays and the wireless communications delay. In addition, the local audio delay can be precisely estimated, which improve precision of the AV synchronization, thereby improving user experience. In addition, the embodiments of the present invention will not greatly increase overall costs. Thus, the present invention can solve the problem of the related art without introducing any side effect or in a way that is less likely to introduce side effects.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing audio and video (AV) synchronization between a video device and a wireless audio device, comprising:
    utilizing a controller of the video device to determine a video delay of a video processing path of the video device;
    utilizing the controller to determine an audio delay of an audio processing path of the video device;
    utilizing the controller to receive information of a communications quality of the wireless audio device from the wireless audio device, to determine a wireless communications delay between the video device and the wireless audio device according to the information of the communications quality;
    utilizing the controller to generate a time map information according to the video delay, the audio delay and the wireless communications delay; and
    transmitting the time map information from the video device to the wireless audio device for AV synchronization between the video device and the wireless audio device.

2. The method of claim 1, wherein the video processing path comprises a video decoder and at least one video processing circuit coupled to an output of the video decoder, and the video delay comprises a delay introduced by the video decoder or the at least one video processing circuit.

3. The method of claim 1, wherein the audio processing path comprises an audio decoder and at least one audio processing circuit coupled to an output of the audio decoder, and the audio delay comprises a delay introduced by the audio decoder or the at least one audio processing circuit.

4. The method of claim 3, wherein the at least one audio processing circuit comprises:
    a delay adjusting circuit, configured to maps a time stamp to the audio data;
    a storage device, coupled to the delay adjusting circuit, configured to store the audio data in conjunction with the time stamp; and
    a digital signal processing circuit, coupled to the storage device, configured to access the audio data, and process the audio data for being played by a built-in speaker of the video device at a time point corresponding to the time stamp;
    wherein the audio delay comprises a delay introduced by the delay adjusting circuit, the storage device or the digital signal processing circuit.

5. The method of claim 1, wherein the wireless audio device generates the information of the communications quality according to packets received from the video device.

6. The method of claim 1, wherein different values of the wireless communications delay correspond to different communications qualities of the wireless audio device, respectively.

7. The method of claim 1, wherein each of the video device and the wireless audio device comprises a Wi-Fi circuit, a timing synchronization function (TSF) of the Wi-Fi circuit of the video device is synchronized with a TSF of the Wi-Fi circuit of the wireless audio device, and utilizing the controller to generate the time map information according to the video delay, the audio delay and the wireless communications delay comprising:
    generating the time map information according to the TSF of the Wi-Fi circuit of the video device.

8. The method of claim 7, wherein utilizing the controller to generate the time map information according to the video delay, the audio delay and the wireless communications delay comprises:
determining a target time point according to the video delay, the audio delay and the wireless communications delay; and
generating the time map information according to the target time point, the TSF of the Wi-Fi circuit of the video device and a system clock value;
wherein the target time point represents a time point of a system clock domain of the video device at which the video data to be displayed or the audio data to be played, and the system clock value represents a time point of the system clock domain of the video device at which the TSF of the Wi-Fi circuit of the video device is synchronized with the TSF of the Wi-Fi circuit of the wireless audio device.

9. The method of claim 8, wherein transmitting the time map information from the video device to the wireless audio device for AV synchronization between the video device and the wireless audio device comprises:
transmitting the audio data in conjunction with the time map information to the wireless audio device, to allow the audio data played on the wireless audio device to be synchronized with the video data displayed on the video device or the audio data played on the video device with aid of the time map information.

10. A video device for performing audio and video (AV) synchronization with a wireless audio device, comprising:
a video processing path, configured to process video data for display;
an audio processing path, configured to process audio data for playback; and
a controller, coupled to the video processing path and the audio processing path, configured to receive information of a communications quality of the wireless audio device from the wireless audio device, in order to determine a wireless communications delay between the video device and the wireless audio device according to the information of the communications quality;
wherein the controller generates time map information according to a video delay of the video processing path, an audio delay of the audio processing path and the wireless communications delay, to allow the video device to transmit the time map information to the wireless audio device for AV synchronization between the video device and the wireless audio device.

11. The video device of claim 10, wherein the video processing path comprises a video decoder and at least one video processing circuit coupled to an output of the video decoder, and the video delay comprises a delay introduced by the video decoder or the at least one video processing circuit.

12. The video device of claim 10, wherein the audio processing path comprises an audio decoder and at least one audio processing circuit coupled to an output of the audio decoder, and the audio delay comprises a delay introduced by the audio decoder or the at least one audio processing circuit.

13. The video device of claim 12, wherein the at least one audio processing circuit comprises:
a delay adjusting circuit, configured to maps a time stamp to the audio data;
a storage device, coupled to the delay adjusting circuit, configured to store the audio data in conjunction with the time stamp; and a digital signal processing circuit, coupled to the storage device, configured to access the audio data, and process the audio data for being played by a built-in speaker of the video device at a time point corresponding to the time stamp;
wherein the audio delay comprises a delay introduced by the delay adjusting circuit, the storage device or the digital signal processing circuit.

14. The video device of claim 10, wherein the wireless audio device generates the information of the communications quality according to packets received from the video device.

15. The video device of claim 10, wherein different values of the wireless communications delay correspond to different communications qualities of the wireless audio device, respectively.

16. The video device of claim 10, wherein each of the video device and the wireless audio device comprises a Wi-Fi circuit, a timing synchronization function (TSF) of the Wi-Fi circuit of the video device is synchronized with a TSF of the Wi-Fi circuit of the wireless audio device, and the controller generates the time map information further according to the TSF of the Wi-Fi circuit of the video device.

17. The video device of claim 16, wherein the controller determine a target time point according to the video delay, the audio delay and the wireless communications delay, and the time map information is generated according to the target time point, the TSF of the Wi-Fi circuit of the video device and a system clock value, wherein the target time point represents a time point of a system clock domain of the video device at which the video data to be displayed or the audio data to be played, and the system clock value represents a time point of the system clock domain of the video device at which the TSF of the Wi-Fi circuit of the video device is synchronized with the TSF of the Wi-Fi circuit of the wireless audio device.

18. The video device of claim 17, wherein the video device transmits the audio data in conjunction with the time map information to the wireless audio device, to allow the audio data played on the wireless audio device to be synchronized with the video data displayed on the video device or the audio data played on the video device with aid of the time map information.

19. A wireless audio device for performing audio and video (AV) synchronization with a video device, comprising:
a wireless communications circuit, configured to receive packets from the video device;
a controller, coupled to the wireless communications circuit, configured to generate information of a communications quality of the wireless audio device, wherein the information of the communications quality is reported to the video device, to allow the video device to determine a wireless communications delay between the video device and the wireless audio device according to the information of the communications quality; and
an audio output device, coupled to the controller, configured to play audio data received from the video device;
wherein the video device transmits a time map information generated according to the wireless communications delay in conjunction with the audio data to the wireless audio device, to allow the audio data played by the audio output device to be synchronized with audio data played on the video device or the video data displayed on the video device with aid of the time map information.

20. The wireless audio device of claim 19, wherein different communications qualities of the wireless audio device correspond to different values of the wireless communications delay, respectively.

* * * * *